Oct. 15, 1929.  W. R. BARRETT  1,732,148
CUTTER MECHANISM
Filed June 27, 1928  2 Sheets-Sheet 1

WITNESSES

INVENTOR
William R. Barrett
BY
ATTORNEY

Oct. 15, 1929.  W. R. BARRETT  1,732,148
CUTTER MECHANISM
Filed June 27, 1928  2 Sheets-Sheet 2
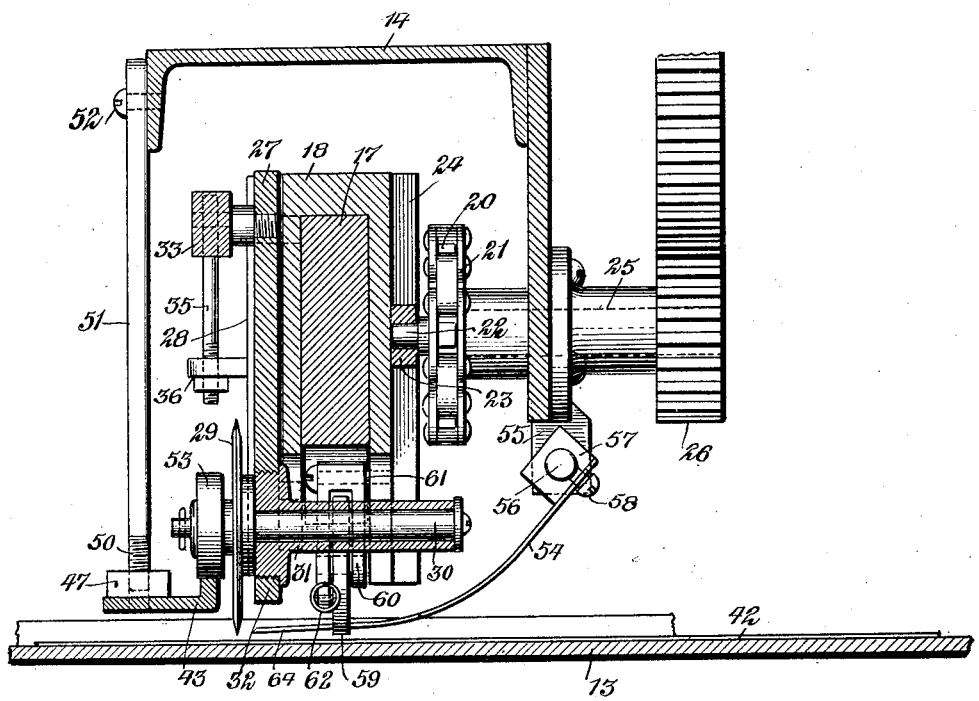
Fig. 3.
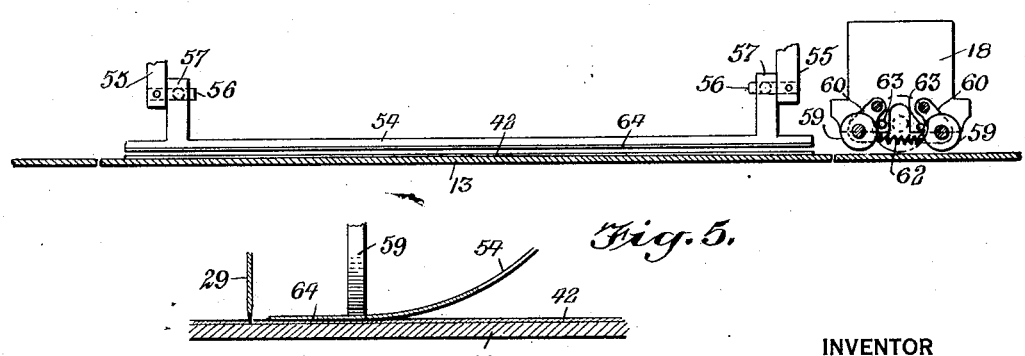
Fig. 4.
Fig. 5.
WITNESSES
INVENTOR
William R. Barrett.
BY
ATTORNEY Patented Oct. 15, 1929

1,732,148

UNITED STATES PATENT OFFICE

WILLIAM R. BARRETT, OF NEW YORK, N. Y.

CUTTER MECHANISM

Application filed June 27, 1928. Serial No. 288,701.

This invention relates to a cutter mechanism designed and adapted to be used in a machine for cutting fabric and like material, which may be used advantageously in a machine such as the one disclosed in United States Letters Patent No. 1,513,688, granted to me.

One of the objects of the invention is the provision in a machine of the indicated character, of a cutter mechanism which will improve the cutting efficiency of the machine.

A further object of the invention is the provision in a fabric cutting machine, of an improved cutter mechanism designed and adapted for bias cutting of sheet material, and which serves in conjunction with a presser foot for effectively clamping or holding the material while being cut.

A further object of the invention is the provision in a machine of the indicated character, of a novel form of presser foot and actuating means therefor.

With the foregoing, and other objects in view, the invention resides in the combination, relative disposition, construction and operation of the parts hereinafter fully described and illustrated in the accompanying drawings, in which—

Fig. 3 is a sectional view taken on the line 3—3 of Fig. 2.

Fig. 4 is a view illustrating the presser foot and means which actuates the same.

Fig. 5 is a sectional view illustrating the manner in which the material is held while being cut.

Figure 1:
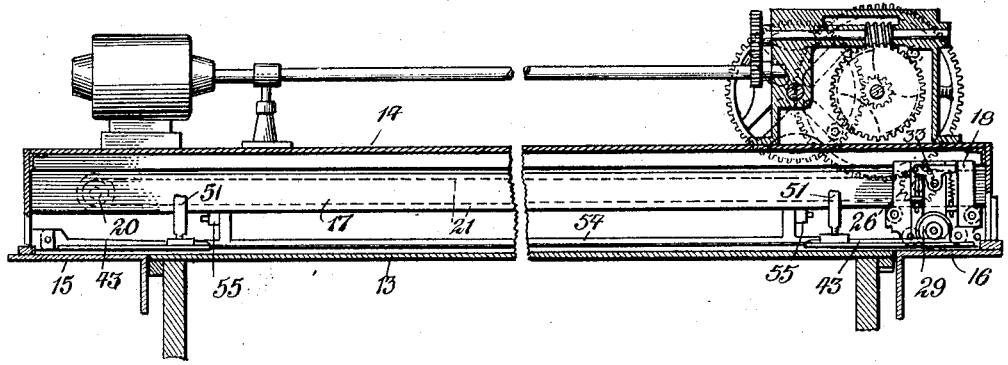
Figure 1 is a transverse sectional view through a machine showing the features of the present invention, portions being broken away.

The type of cutting machine to which the present invention is applicable includes a support for material to be cut, a carriage having guided movement relatively to the support, a beam structure on the carriage which supports the cutter mechanism, and which also supports the power and driving mechanism which operates to move the carriage step by step, and also to operate the cutter mechanism intermittently, in timed accord, for the purpose of cutting a piece of fabric or like material on a bias, into strips of predetermined lengths and widths.

In the drawings there is shown a support 13 for material to be cut. The carriage which moves relatively to the support 13 includes a structure 14, and side members 15 and 16 are arranged respectively at opposite sides of the support 13 and are movably mounted on the support 13 by means of rollers or wheels (not shown). The structure 14 will be movable with respect to the carriage in order to change the position of the cutting means to be hereinafter described. The structure 14 includes a guide 17 which is disposed above the support 13 and extends across the same with the opposite ends respectively disposed beyond the opposite side edges of the support 13. The guide 17 is fixed with relation to the structure 14. A slide or traveler 18 is arranged for movement on the guide 17, said traveler 18 having rollers 19 which run in contact with the guide 17. These rollers 19 eliminate unnecessary friction. Sliding movement is imparted to the traveler 18 by means of sprockets 20, and a chain 21 which encircles the sprockets 20. The chain 21 is connected with the traveler 18 by a sliding joint consisting of a pin 22 carried by one of the links of the chain, and a block 23 which receives the pin 22, the said block being movable up and down in a groove 24 in the traveler 18. The shafts of both of the sprockets 20 are supported by bearings on the structure 14, and one of the sprocket shafts designated 25 has connected therewith a pinion 26 which meshes with one of the gears of a gear train driven by the power means of the machine. The traveler 18 is operated intermittently, and is caused to travel on the guide 17 across the support 13 from one side to the other, and comes to rest at the end of each travel direction above each of the side members 15 and 16 of the carriage. A slide plate 27 is slidably mounted between guides 28 on the traveler 18 for up and down movement. A disk cutter 29 is rotatably mounted on an axle 30 positioned in a hub 31 detachably connected as at 32 with the lower end of the plate 27. A rock lever 33 is arranged on the upper end of the slide plate 27, and one end of said lever 33 has pivotally connected therewith as at 34 a short flexible rod 35, whose lower end is adjustably connected with one of the guides 28, as at 36. The opposite end of the lever 33 has connected therewith one end of a tension spring 37 as at 38, and the opposite end of said spring is connected as at 39 with a threaded member 40 adjustable in a lug 41 extending laterally from the other guide 28. The lever 33, rod 35 and spring 37 constitute a means having a normal tendency to constantly urge the disk cutter 29 downwardly to a position in which it will cut the material or fabric indicated at 42 laid on the support 13.

Figure 2:
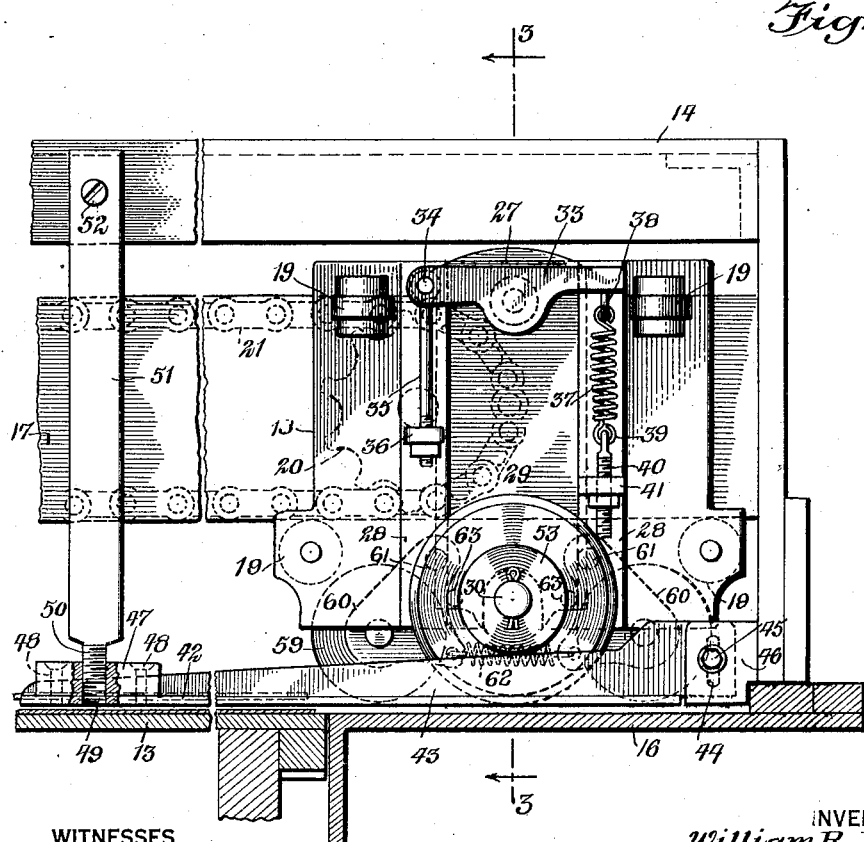
Fig. 2 is an enlarged sectional elevation showing certain features of the construction and operation of the cutting means.

In order to elevate the disk cutter 29 so that it will be elevated an appreciable distance above each of the side members 15 and 16 at the end of its cutting strokes, there is provided means for that purpose presently to be described. A track member 43 is arranged at each end of the structure 14. The upper edge of the track member 43 is inclined so its highest point will be above the related side member. One end of the track member 43 is provided with a slot 44 which accommodates a clamping bolt 45 carried by a lug 46 on a portion of the structure 14. The opposite end of the track member 43 is provided with a block 47 detachably secured thereto by screws 48. The block 47 has a threaded bore 49 therein which receives the lower threaded end 50 of a rigid member 51 secured as at 52 to a portion of the structure 14. The track member 43 at each end of the structure 14 is therefore adjustable up and down. The axle 30 has arranged thereon a roller 53 which is positioned so as to run on each of the track members 43. It will now be apparent that as the traveler 18 moves along the guide 17, there will come a time when the roller 53 runs up on the inclined edge of the particular track member 43, and as a consequence the slide plate 27 will be moved upwardly, carrying with it the disk cutter 29 to a position above the particular side member of the carriage, as shown most clearly in Fig. 2. This will permit the structure 14 to be moved to change the position of the cutter 29 without impairing the cutting edge of the cutter. When the cutter 29 is in the elevated position, the spring 37 will be placed under tension. When the roller 53 runs off each track member 43, the spring 37 comes into play to move the slide plate 27 downwardly, and therefore, the cutter 29 in cutting contact with the material or fabric to be cut.

In order to effectively hold or clamp the fabric while being cut, there is provided a presser foot 54. The presser foot 54 is supported from depending lugs 55 on the structure 14. Each lug 55 carries a pin 56 which extends through a lug 57 on the presser foot, and a set screw 58 carried by the lug 57 is screwed home into engagement with the pin 56. The presser foot 54 is thus rigidly secured. The portion of the presser foot 54 which engages the fabric is flexible, and is disposed normally out of contact with the fabric to be cut, but is adapted to be flexed into contact therewith. This is accomplished by rollers 59 respectively carried by members 60 pivotally connected as at 61 with the traveler 18. A tension spring 62 is connected with the members 60. Each member 60 is engageable with a pin 63 on the traveler 18 to limit the movement thereof to hold the roller connected therewith elevated slightly above the upper surface of the support 13 in each of the side members 15 and 16, as the normal position. Each of the rollers 59, however, will be slightly below the longitudinal flexible edge portion 64 of the presser foot, so that the rollers 59 will exert downward pressure on the edge portion 64 to flex it into clamping engagement with the fabric to hold it against movement while being cut by the disk cutter 29. The presser foot 54 is substantially equal in length to the width of the support 13.

I claim:

1. In a cutting machine, the combination with a support for material to be cut, of a presser foot mounted above said support and having a longitudinal flexible edge portion disposed normally out of contact with the material to be cut, a traveler having movement relatively to said support, cutting means arranged on said traveler which cuts the material in the movement of the traveler, and means to exert pressure on said flexible edge portion to flex it into clamping engagement with the material while being cut.

2. In a cutting machine, the combination with a support for material to be cut, of a presser foot mounted above said support and having a longitudinal flexible edge portion disposed normally out of contact with the material to be cut, a traveler having movement relatively to said support, cutting means arranged on said traveler which cuts the material in the movement of the traveler, and tension rollers carried by said traveler to exert pressure on said flexible edge portion to cause it to hold the material in contact with said support while being cut.

3. In a cutting machine, the combination with a support for material to be cut, of a presser foot mounted above said support and having a longitudinal flexible edge portion normally disposed out of contact with the material to be cut, a traveler having movement relatively to said support, a cutter operated by the movement of said traveler to cut the material, and means carried by the traveler to flex said edge portion into clamping engagement with the material while being cut.

4. In a cutting machine, the combination with a support for material to be cut, of a presser foot mounted above said support and having a longitudinal flexible edge portion normally disposed out of contact with the material to be cut, a traveler, a cutter operated by the movement of said traveler to cut the material, members pivotally connected with the traveler, rollers carried said members respectively, a tension spring acting on said members and having a normal tendency to urge said members toward each other so that the rollers will be positioned to run on said flexible edge portion in the movement of the traveler, for the purpose of flexing said edge portion into clamping engagement with the material while being cut.

5. In a cutting machine, the combination with a support for material to be cut, of a traveling cutter carriage, a presser foot mounted above said support and adapted to coact with the support to clamp the material against movement relatively to said support, and means on said carriage adapted to travel on said presser foot to exert a downward force on the latter to set up the clamping action for the purpose mentioned.

6. In a cutting machine, the combination with a support for material to be cut, of a presser foot mounted above said support and adapted to coact with the support to clamp the material against movement relatively to said support, and yieldable means adapted to travel on said presser foot to exert a downward force on the latter to set up the clamping action for the purpose mentioned.

7. In a cutting machine, the combination with a support for material to be cut, of a structure having guided movement relatively to said support, a traveling cutter carriage on said structure, a presser foot secured to said structure and adapted to coact with the support to clamp the material against movement relatively to said support, and means on said carriage adapted to travel on said presser foot to exert a downward force on the latter to set up the clamping action for the purpose mentioned.

8. In a cutting machine, the combination with a support for material to be cut, of a traveling cutter carriage, a presser foot mounted above said support and adapted to coact with the support to clamp the material against movement relatively to said support, and rollers on said carriage adapted to travel on said presser foot to exert a downward force on the latter to set up the clamping action for the purpose mentioned.

9. In a cutting machine, the combination with a support for material to be cut, of cutting means having guided movement across the support adapted to cut the material, and means operating in conjunction with the cutting means to elevate the latter when it reaches a position beyond either side of said support.

10. In a cutting machine, the combination with a support for material to be cut, of cutting means having guided movement across the support adapted to cut the material, means operating in conjunction with the cutting means to elevate the latter when it reaches a position beyond either side of said support, and means constantly acting on said cutting means serving to lower it to the cutting position when said cutting means is free from the influence of the elevating means.

11. In a cutting machine, the combination with a support for material to be cut, of a traveler having guided movement across the support, a cutter mounted for up and down movement on said traveler, yieldable means having a normal tendency to exert a downward force on the cutter to enable it to cut the material in the movement of the traveler, and means adapted to cooperate with said cutter to elevate the cutter when it reaches a position beyond either side of said support.

12. In a cutting machine, the combination with a support for material to be cut, of a traveler having guided movement across the support, a presser foot mounted above said support and adapted to coact with said support to clamp the material against movement relatively to said support, a rotary cutter mounted on said traveler, and means mounted on said traveler adapted to exert a downward force on said presser foot to clamp the material while it is being cut by the cutter in the movement of said traveler.

13. In a cutting machine, the combination with a support for material to be cut, of a structure having guided movement longitudinally of said support, a traveler having guided movement on said structure transversely with respect to said support, a presser foot mounted above said support and adapted to coact with said support to clamp the material against movement relatively to said support, a rotary cutter mounted on said traveler, and means mounted on said traveler adapted to exert a downward force on said presser foot to clamp the material while it is being cut by the cutter in the movement of said traveler.

Signed at 47 Fulton St., in the county of New York and State of New York, this 21st day of June, A. D., 1928.

WILLIAM R. BARRETT.